No. 615,521. Patented Dec. 6, 1898.
F. BEAUCHAMP.
APPARATUS FOR REDUCING VIBRATION IN CYCLES, &c.
(Application filed July 9, 1898.)
(No Model.)
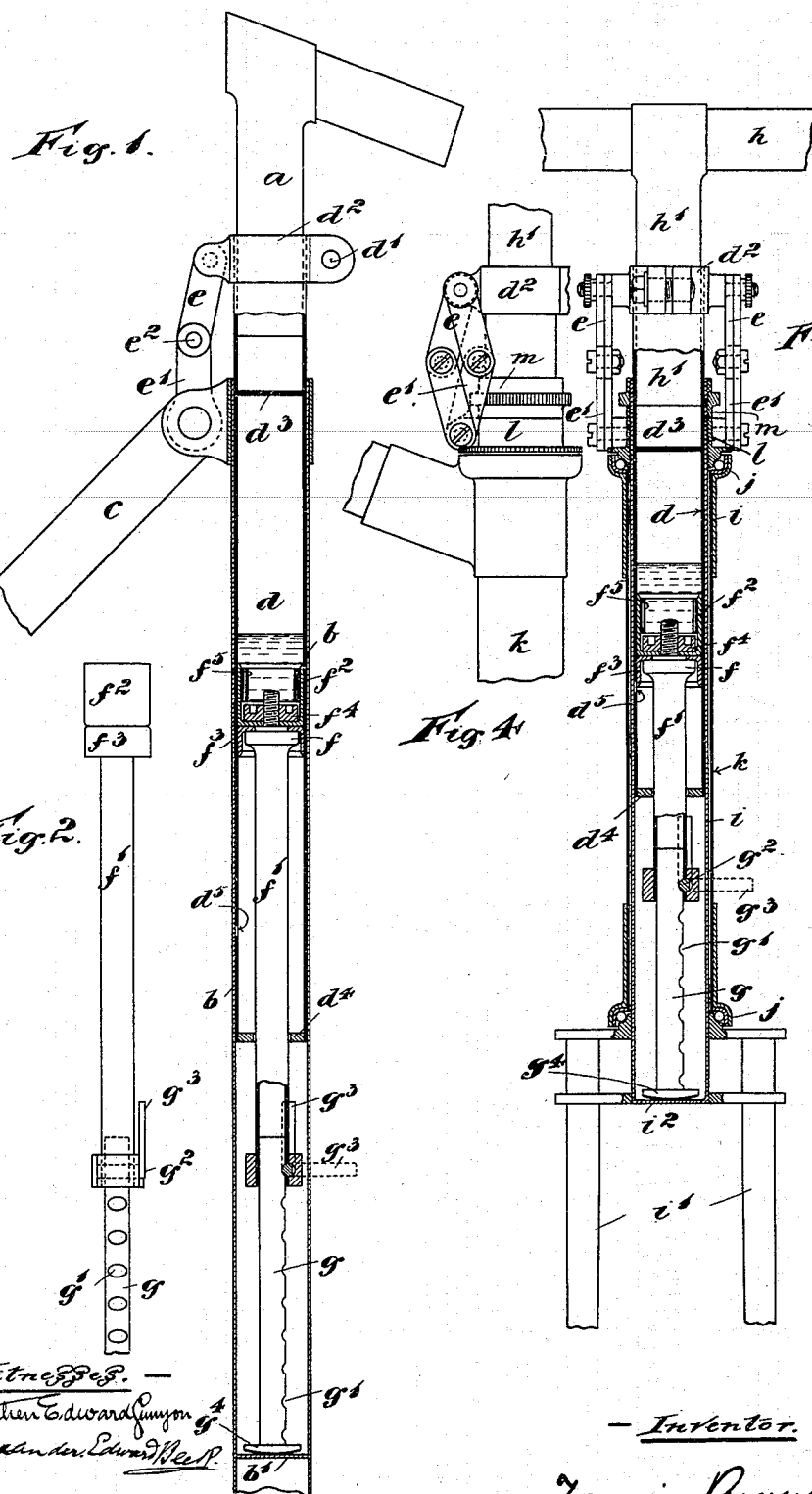

UNITED STATES PATENT OFFICE.

FRANCIS BEAUCHAMP, OF LONDON, ENGLAND.

APPARATUS FOR REDUCING VIBRATION IN CYCLES, &c.

SPECIFICATION forming part of Letters Patent No. 615,521, dated December 6, 1898.

Application filed July 9, 1898. Serial No. 685,566. (No model.)

*To all whom it may concern:*

Be it known that I, FRANCIS BEAUCHAMP, engineer, a subject of the Queen of Great Britain, residing at Sunny Side, The Green, South Tottenham, London, in the county of Middlesex, England, have invented certain new and useful Improvements in Apparatus for Reducing the Vibration in Cycles and other Like Vehicles, (for which I have applied for a patent in Great Britain, No. 27,132, bearing date November 19, A. D. 1897,) of which the following is a specification.

The object of my invention is to neutralize to a greater or less extent the vibration, jarring, and jolting which cyclists and others experience when riding or driving cycles or other vehicles and which are caused by the cycle or other vehicle passing over irregularities, obstructions, or unevenness in the road or track, the vibrations being transmitted (in the case of cycles) to the body of the rider chiefly through the saddle-pillar and the handle-bar.

In order that my invention may be fully understood, I will proceed to describe the same as applied to the saddle-pillar and handle-bar of a bicycle by the aid of the accompanying drawings, in which—

Figure 1 is a side elevation, partly in section, of a saddle-pillar and down-tube of a bicycle with my improvements applied thereto. Fig. 2 is an elevation of the piston and piston-rod shown in Fig. 1. Fig. 3 is a front elevation, partly in section, of a head-socket or steering-column of a bicycle with my improvements applied thereto; and Fig. 4 is a side elevation of the upper part of the head-socket or steering-column shown in Fig. 3.

Similar letters relate to like parts in all the figures of the drawings.

Referring to Figs. 1 and 2, $a$ is the saddle-pillar, $b$ the down and guide tube, and $c$ the back fork, of a bicycle. Instead of the saddle-pillar $a$ being fitted adjustably into the upper end of the down-tube $b$, as is usually the case, I fit the same into the upper end of the telescopic tube $d$, to which it is rigidly clamped by a bolt which passes through the holes $d'$ in the clamp $d^2$ in the manner that will be understood in connection with bicycle fittings of this kind. The clamp $d^2$ is connected to the down-tube $b$ by the links $e\ e'$, forming a knee-joint or flexible coupling, which, while allowing of free up-and-down movement of the telescopic tube $d$ and saddle-pillar $a$, effectually prevents the telescopic tube $d$ from turning in the down-tube $b$. The telescopic tube $d$ is provided with an air-tight partition or stop at $d^3$ toward its upper end, and from its lower and open end is inserted the piston $f$ with its hollow piston-rod $f'$, as shown.

$d^4$ is a guide-piece, which may be inserted in the end of the tube $d$ after the piston $f$ is in place. The piston $f$ is preferably composed of upper and lower cup-leathers $f^2\ f^3$, held in place by a screw-nut $f^4$, as shown.

$f^5$ is a spring similar to a clock-spring, which is inserted into the cup-leather $f^2$ in a compressed state and allowed to expand when in place, thereby insuring close contact between the cup-leather and the inner surface of the telescopic tube $d$. The edge of the upper cup-leather $f^2$ is covered with oil, as shown, which oil is preferably of a thick and more or less viscous character. The lower end of the hollow piston-rod $f$ is provided with an extension-spindle $g$, which is capable of being adjusted longitudinally in the hollow piston-rod $f$ by means of the notches $g'$, into any one of which the locking-pin $g^2$ engages when its handle $g^3$ is turned into the position shown in full lines in Figs. 1 and 2; but when the said handle is turned into the position shown in dotted lines in Fig. 1 the spindle $g$ may be withdrawn, a portion of the locking-pin $g^2$ being cut away for that purpose. The head $g^4$ of the lower end of the extension-spindle $g$ is adapted to rest upon or bear against a stop or partition $b'$ in the down-tube $b$.

Supposing now that the saddle-pillar $a$, telescopic tube $d$, piston $f$, and the extension-spindle $g$ are all detached from the bicycle, the lower link $e'$ being attached to the down-tube $b$ and the upper link $e$ to the telescopic tube $d$, (the screw-pin $e^2$ being removed,) the parts may be put together in the following manner: The telescopic tube is reversed and the necessary quantity of oil is poured into it from its lower open end. The piston and rod are inserted as far beyond the air-hole $d^5$ as the imprisoned air in the tube will allow.

The guide-piece $d^4$ is now placed on the rod $f'$ and fitted in place in the end of the tube $d$. The locking-pin $g^2$, with its collar, is now placed onto the end of the piston-rod $f'$. The handle $g^3$ is turned into the position shown in dotted lines in Fig. 1. The extension-spindle is inserted until the required notch comes opposite the locking-pin $g^2$, which is then turned into the position shown in full lines in Figs. 1 and 2. It will be understood that the adjustment of the extension-spindle regulates the amount of the air-space between the top surface of the oil and the partition $d^3$ when the telescopic tube $d$ is in place, as shown in Fig. 1, and by this means a cushion of air initially compressed to a greater or less extent is obtained, according to the weight of the rider, the condition of the roads to be traveled, and other circumstances. The telescopic tube $d$, with its piston $f$, piston-rod $f'$, and extension-spindle $g$, is now inserted in the down-tube $b$, the head $g^4$ resting upon the partition or stop $b'$, as shown, and the upper end of the telescopic tube $d$ standing at a distance above the top of the down-tube, dependent upon the amount of projection of the extension-spindle from the lower end of the piston-rod $f'$. Pressure is now put upon the top of the telescopic tube $d$ until the holes in the free ends of the links $e$ $e'$ coincide. The screw-pin $e^2$ is then inserted and the parts are thereby held together. It will be understood that the act of bringing the two links $e$ and $e'$ together will have compressed the air above the piston $f'$ and the connecting together of the links $e$ $e'$ will prevent such air from reëxpanding. The imprisoned air will therefore form a more or less yielding cushion between the frame of the machine and the saddle-pillar $a$, which latter is clamped in the upper open end of the telescopic tube $d$ in a similar manner to that in which it is usually clamped into the upper open end of the down-tube. I find that such compressed-air cushion lasts for a considerable time; but when it is desired to renew the same it is only necessary to remove the screw-pin $e^2$, withdraw the telescopic tube $d$, invert the same, so that the oil runs back to the partition or stop $d^3$, and draw back the piston-rod $f'$ until the edge of the cup-leather $e^3$ passes the air-hole $d^5$, when a fresh supply of air will enter and be imprisoned as soon as the piston $f$ is forced back past the air-hole $d^5$. The parts may now be returned to their places in the cycle and will be ready for use again.

The application of my invention to the handle-bar of a bicycle is illustrated in Figs. 3 and 4.

$h$ is the handle-bar, the stem $h'$ of which is clamped firmly in the top of the telescopic tube $d$, which latter is furnished with a clamp $d^2$, partition or stop $d^3$, guide-piece $d^4$, air-hole $d^5$, piston $f$, piston-rod $f'$, and extension-spindle $g$, similar to those described with reference to Figs. 1 and 2. The telescopic tube $d$, with its downwardly-projecting extension-spindle $g$, is inserted into the hollow steering-spindle $i$, which carries at its lower end the front fork $i'$, the head $g^4$ of the extension-spindle $g$ resting on the stop or partition $i^2$, as shown. The hollow steering-spindle $i$ is adapted to turn in ball-bearings $j$ $j'$ in the head-socket or steering-column $k$, and in order to allow a limited up-and-down movement of the handle-bar $h$ and yet insure that the steering motion of such handle-bar shall be transmitted to the hollow steering-spindle $i$ the said handle-bar and the hollow steering-spindle are firmly connected together in the following manner: On each of the two opposite sides of the clamp $d^2$, on the top of the telescopic tube $d$, is a screw stud or pin $e^2$, to which is fitted a pair of double links $e$ $e'$, somewhat after the manner of what are known as "lazy-tongs." The lower ends of the links $e'$ are centered to lugs formed on either side of the sleeve $l$, in the bottom of which is formed the race for the ball-bearings $j$ and which sleeve $l$ is locked in position on the hollow steering-spindle $i$ by means of the keeper-ring $m$, screwed on the upper part of the said spindle $i$. It will now be understood that the handle-bar $h$ being connected with the telescopic tube $d$ by the lazy-tongs device $e$ $e'$ the vibrations of the front wheel and frame of the cycle are intercepted and more or less absorbed by the cushion of compressed air which is thus interposed between the said handle-bar and the front wheel and frame of the cycle, while at the same time the handle-bar and the hollow steering-spindle $i$ are so connected that they act as if in one piece so far as regards the steering motion.

The handle-bar $h$, telescopic tube $d$, and the other parts in connection therewith can be easily removed when it is required to recharge the telescopic tube $d$ with air or for other purposes by removing the two screw-pins $e^2$ and proceeding in the manner described with reference to Figs. 1 and 2.

Suitable stops are provided in connection with the links $e$ $e'$ in Figs. 1, 3, and 4 in order to prevent any two of the links from being drawn into a straight line under any circumstances.

In some cases instead of the links $e$ $e'$ I employ a screw-pin fixed to an arm projecting from one of the parts to be connected together, which pin passes freely through a hole in a similar arm on the other part to be connected, the distance apart of such arms being regulated by a nut on the screw-pin.

I claim—

In combination in a vehicle, the frame, the tube $d$ having a diaphragm $d^3$ therein below its upper end leaving a socket at said upper end above the diaphragm for receiving the part to be supported and leaving a piston-chamber below it, a clamp device at the upper end of said socket, a flexible connection between the said upper end and the frame to permit the tube to have longitudinal movement but to prevent its rotation, a piston in the said tube having a rod extending through the closed bottom of the tube, the guide for the tube to slide in and the adjustable rod extending from the piston-rod to bear on the bottom of the guide, substantially as described.

In witness whereof I have hereunto set my hand in presence of two witnesses.

FRANCIS BEAUCHAMP.

Witnesses:
STEPHEN EDWARD LUNGON,
ALEXANDER EDWARD BECK.